(No Model.)  2 Sheets—Sheet 1.
G. W. RAWSON.
DRYING APPARATUS.
No. 251,734.  Patented Jan. 3, 1882.
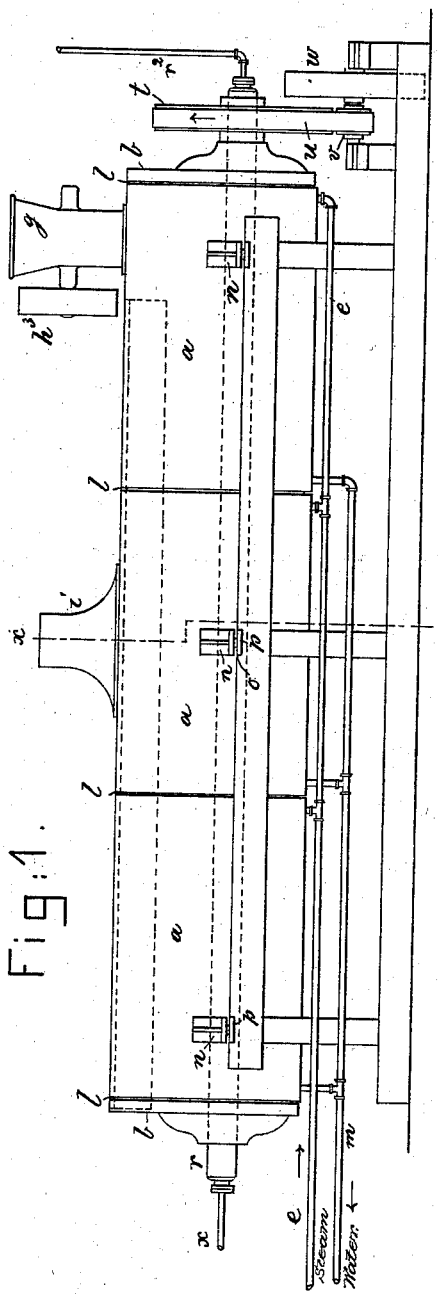
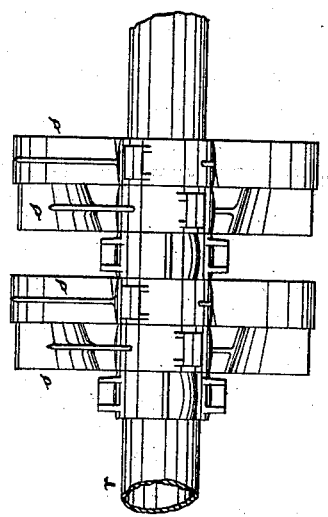
Witnesses.
John F. C. Perinkert
L. F. Connor.
Inventor.
George W. Rawson,
by Crosby & Gregory Attys (No Model.) 2 Sheets—Sheet 2.
G. W. RAWSON.
DRYING APPARATUS.
No. 251,734. Patented Jan. 3, 1882.
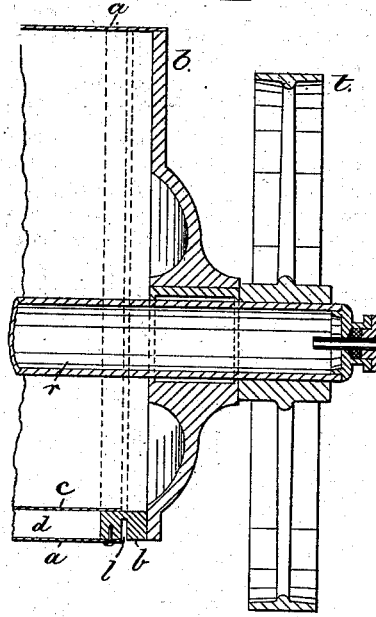
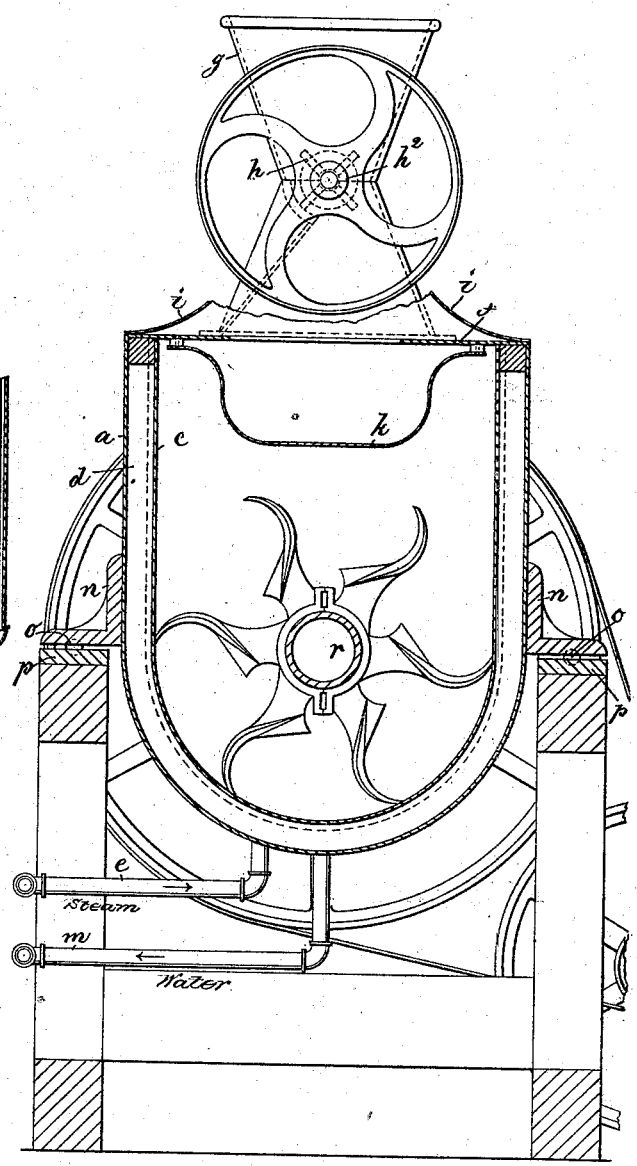
Witnesses.
John F. C. Printhert
L. F. Connor.
Inventor.
George W. Rawson,
by Crosby & Gregory Attys

UNITED STATES PATENT OFFICE.

GEORGE W. RAWSON, OF BOSTON, MASSACHUSETTS.

DRYING APPARATUS.

SPECIFICATION forming part of Letters Patent No. 251,734, dated January 3, 1882.

Application filed October 10, 1881. (No model.)

*To all whom it may concern:*

Be it known that I, GEORGE W. RAWSON, of Boston, Suffolk county, State of Massachusetts, have invented an Improvement in Drying Apparatus, of which the following description, in connection with the accompanying drawings, is a specification.

In this invention the casing of the drying apparatus is composed of a stationary shell within which is placed a metal lining, thus constituting a space between the shell and lining for the reception of steam to heat the contents of the casing or apparatus. The agitator extended longitudinally through the casing is composed of a hollow shaft heated by steam, the shaft having on it a series of curved arms or blades having broad faces inclined in the direction of their width with relation to the axis of the shaft of the agitator, that they may gradually lift and carry the contents of the casing toward its delivery end, which is somewhat lower than its receiving end, which is provided with a hopper. I have provided the upper portion of the casing with a long open-sided trough to receive steam and moist vapor rising from the materials being dried, whether animal or vegetable substances. A casing of this kind, composed of outer and inner walls or plates of metal, when heated by steam, expands unequally by reason of differences of heat, which is fatal to the durability and efficiency of the apparatus unless overcome. To obviate this evil I have slotted longitudinally the metal ribs with which the outer and inner plates of the casing are riveted or bolted, so that the said slots, by their contraction and expansion, compensate for the unequal expansion of the outer and inner metal plates.

Figure 1 represents, in side elevation, a drying apparatus embodying my invention; Fig. 2, a detail, in side view, of part of the agitator removed. Fig. 3 is an enlarged vertical sectional detail of the receiving end of the apparatus, showing the hollow shaft of the agitator, and the slotted rib with which are secured the metal plates of the casing; and Fig. 4, a vertical section on the line $xx$, Fig. 1, the uptake being broken partially away.

This apparatus will be chiefly used for drying animal matter to be used for fertilizers, or may be used for drying other substances.

The long casing is composed of a series of metal plates, $a$, of boiler or other iron, properly riveted or secured to a series of U-shaped metallic ribs, $b$, having the shape desired for the cross-section of the casing, and of a second series of metal plates, $c$, which are riveted or attached to the inner sides of the said ribs $b$, so as to leave a space, $d$, for the reception of steam through the steam-pipe $e$, connected with any usual or suitable steam-generator, the steam admitted in the space $d$, between the said metal plates, keeping the contents of the casing at the proper degree of heat, so that it will be dried. The upper portion of the casing is composed of a metal plate, $f$, having at one end a hole, over which is placed a suitable feeding-hopper, $g$, it having in it a feeding-wheel, $h$, (shown in Fig. 4,) on a shaft, $h^2$, having on it a pulley, $h^3$, by which the feeding-wheel is driven at the desired speed from any suitable prime mover. The upper plate has a second opening communicating with an uptake, $i$, leading to a suitable chimney, through which the vapor and odor from the material being dried rise; or the uptake may be connected with an exhauster of usual construction.

To obviate too strong a current directly into the uptake a long metal trough, $k$, (shown in full lines, Fig. 4, and in section, Fig. 1,) is connected with the under side of the metal plate $f$ only at intervals, thus leaving open spaces between the upper plate and the edges of the trough for nearly its whole length for the entrance of the vapor and gases rising from the material in the casing.

To compensate for unequal expansion and contraction of the metal plates $a$ $c$, which are unequally heated, the ribs $b$ are slotted longitudinally, as shown at $l$, the said slots closing and opening to compensate for the variations in the expansion of the said plates. Water of condensation is taken from the space $d$ by the pipe $m$.

The outer portion, $a$, of the casing has a series of lugs or brackets, $n$, all of which, except those at the receiving end of the casing, rest upon ball-bearings $o$, supported in suitable elongated recesses in the plate $p$ of the frame-work, thus forming a loose connection between the casing and its supports to further provide for the free expansion and contraction of the long metal casing. The brackets at the receiving end of the casing are firmly secured to the frame-work.

The agitator within the casing is composed of a hollow shaft, $r$, supplied with steam, or it may be hot air, through the pipe $r^2$, and of a series of arms, $s$, properly bolted thereto. These arms, curved as shown in Fig. 4, are made broad, as in Fig. 2, and are inclined in the direction of their width with relation to the axis of shaft $r$, so that as the latter shaft is rotated the said arms enter, agitate, lift the material, and then let it fall, thus gradually carrying the said material from the receiving to the delivery end of the casing, where, when suitably dried, it will be discharged continuously through a suitable opening, the material being also fed into the casing continuously.

Straight arms set at an inclination have been before employed; but they do not lift the material to the same extent as do the curved arms, and are therefore not so efficient as the latter.

The shaft $r$, having its bearings in the walls of the casing, has upon it a pulley, $t$, which receives a belt, $u$, from a small pulley, $v$, on a short driving-shaft provided with a large belt-pulley, $w$, driven from any suitable source of motion.

Water of condensation is taken from shaft $r$ by the pipe $x$.

I am aware that thin metal blades have been connected with hollow shafts, as in United States Patent No. 139,528, and that said blades have been so placed as to cut into and crowd or push the material from one toward the other end of a cylinder; but a thin blade, or one having a thin face, such as shown in said patent, could not lift the material as do the arms herein described.

I claim—

1. The slotted ribs, combined with the outer and inner metal plates of the casing secured thereto, to compensate for unequal expansion of the said plates, substantially as described.

2. The metal casings $a$ $c$, having the steam-space $d$ between them, combined with the hollow shaft $r$, and the series of broad-faced arms $s$, curved as shown and described, to lift the material, the broad faces of the arms being inclined in the direction of their width with relation to the axis of the said shaft, as set forth, to operate all substantially as and for the purpose described.

3. The metal casings $a$ $c$, steam-space $d$ between them, and the upper plate, $f$, hollow shaft $r$, and its series of curved broad-faced arms to lift the material, combined with the long trough $h$, connected with the said upper plate only at intervals, to thus leave passages nearly the entire length of the edges of the said trough for the passage of vapor and gases to the uptake $i$, substantially as described.

4. The metal casings $a$ $c$, having steam-space $d$ between them, combined with the hollow shaft and its curved and inclined arms $s$, to operate all as shown and described.

In testimony whereof I have signed my name to this specification in the presence of two subscribing witnesses.

GEO. W. RAWSON.

Witnesses:
G. W. GREGORY,
W. H. SIGSTON.